United States Patent [19]

Setlur et al.

[11] Patent Number: 5,717,826
[45] Date of Patent: Feb. 10, 1998

[54] UTTERANCE VERIFICATION USING WORD BASED MINIMUM VERIFICATION ERROR TRAINING FOR RECOGNIZING A KEYBOARD STRING

[75] Inventors: Anand Rangaswamy Setlur, Warrenville; Rafid Antoon Sukkar, Aurora; Joseph Lawrence LoCicero, Riverside; Grzegorz Szeszko, Chicago, all of Ill.

[73] Assignee: Lucent Technologies Inc., Murray Hill, N.J.

[21] Appl. No.: 514,034

[22] Filed: Aug. 11, 1995

[51] Int. Cl.[6] ............................................. G10L 5/06
[52] U.S. Cl. .................... 395/2.61; 395/2.49; 395/2.65
[58] Field of Search ............................ 395/2.45, 2.49, 395/2.6–2.61, 2.64, 2.65

[56] References Cited

U.S. PATENT DOCUMENTS

| | | | |
|---|---|---|---|
| 4,896,358 | 1/1990 | Bahler et al. | 381/43 |
| 5,199,077 | 3/1993 | Wilcox et al. | 381/43 |
| 5,440,662 | 8/1995 | Sukkar | 395/2.45 |
| 5,559,925 | 9/1996 | Austin | 395/2.4 |
| 5,579,436 | 11/1996 | Chou et al. | 395/2.53 |
| 5,613,037 | 3/1997 | Sukkar | 395/2.65 |
| 5,625,748 | 4/1997 | McDonough et al. | 395/2.6 |

OTHER PUBLICATIONS

M.G. Rahim, Chin–Hiu Lee & B. Juang, "*Discriminative Utterance Verification For Connected Digits Recognition*" European Conference on Speech Communication and Technology, Madrid, Sep. 1995, ISSN 1018–4074.

C. Lee, B. Juang, R. A. Sukkar, "*A Vocabulary Independent Discriminatively Trained Method For Rejection Of Non–Keywords In SubWord Based Speech Recognition*", European Conference on Speech Communication and Technology, Madrid, Sep. 1995, ISSN 1018–4074.

W. Chou, B. Juang & C.H. Lee, "*Segmental GPD Training of HMM Based Speech Recognizer*", Proceedings 1 ICASSP, pp. 473–476, vol. 1.

C. Lee, W. Chou, B. Juang, L. R. Rabiner and J. G. Wilpon, "*Contex–dependent Acoustic Subword Modeling For Connected Digit Recognition*", The Journal of the Acoustical Society of America, vol. 94, No.3, Pt. 2, p. 179 Sep. 1993.

R. C. Rose, et al. "*A Training Procedure For Verifying String Hypotheses In Continuous Speech Recognition*", IEEE May 1995, pp. 281–284.

Primary Examiner—Allen R. MacDonald
Assistant Examiner—Robert C. Mattson
Attorney, Agent, or Firm—Jack R. Penrod

[57] ABSTRACT

A speech recognition method and apparatus which has a first stage to provide keyword hypotheses and a second stage to provide testing of those hypotheses by utterance verification. The utterance verification used has three separate models for each word: one keyword verification model, one misrecognition verification model, and one non-keyword verification model. Further, all three are developed independently of the recognizer keyword models. Because of this independence, the three verification models can be iteratively trained using existing speech data bases to jointly provide a minimum amount of verification errors.

8 Claims, 5 Drawing Sheets

WORD UTTERANCE VERIFICATION METHOD

VERIFICATION HMM TRAINING METHOD

UTTERANCE VERIFICATION USING WORD BASED MINIMUM VERIFICATION ERROR TRAINING FOR RECOGNIZING A KEYBOARD STRING

TECHNICAL FIELD

The invention relates to automatic speech recognition and more particularly to a method and apparatus for verifying one or more words of a sequence of words.

DESCRIPTION OF THE PRIOR ART

Utterance verification is a process by which keyword hypotheses produced by a speech recognizer are verified to determine if the input speech does indeed contain the recognized words. In many known speech recognition applications, such as keyword spotting, utterance verification is performed using statistical hypothesis testing. Typically, likelihood ratio functions are formulated for this purpose, where a null hypothesis that the input speech segment does contain the recognized keyword is tested against an alternate hypothesis that the segment does not contain that keyword. In a known system 100 that is shown in FIG. 1, the alternate hypothesis includes two equally important categories: non-keyword speech and keyword speech that was misrecognized by the speech recognizer. Known utterance verification methods emphasize the first category of the alternate hypothesis when estimating the probability distribution. Since the second category is not considered, the ability to reliably test for misrecognition errors is limited. Further, many of the systems and methods proposed as solutions use the recognition models themselves in formulating the verification likelihood ratios. Thus, Speaker Independent Recognizer Hidden Markov Models (HMMs) and Filler HMMs are stored in mass storage device 110. These models are used by the Speaker Independent Recognition unit 206 to formulate the hypothesis keyword that is subsequently verified. In the system 100, connection 122 and 124 connect the Speaker Independent Recognizer HMMs and the Filler HMMs stored in mass storage unit 110 to utterance recognition unit 130. Thus, the same models are used for recognition as well as rejection. For system 100, and similar systems, the recognizer HMMs are used to perform two different functions, so recognition performance versus verification performance tradeoffs are necessarily involved in such a design.

It is an object of the invention to provide a speech recognition system and method in which both utterance verification categories are considered and modeled independently to improve overall verification performance.

It is an object of the present invention to provide a speech recognition system and method in which the verification is performed using verification specific models that are constructed to specifically minimize the verification error rate.

SUMMARY OF THE INVENTION

Briefly stated, in accordance with one aspect of the invention, the aforementioned objects are achieved by formulating a verification test by constructing and discriminatively training verification-specific models to estimate the distributions of the null and alternate hypotheses. In addition, a composite alternate hypothesis model that includes both alternate hypothesis categories described above is constructed. The hypothesis test is developed in the context of recognizing and verifying a string of keywords (e.g., connected digit strings). This discriminative training procedure is constructed to minimize the verification error rate of each word in the recognized string. This training procedure is thus referred to as Word-Based Minimum Verification Error (WB-MVE) training. The use of such a training procedure along with verification-specific models provide a way to focus exclusively on minimizing the overall verification error rate in performing a likelihood ratio test.

DETAILED DESCRIPTION

Figure 1:
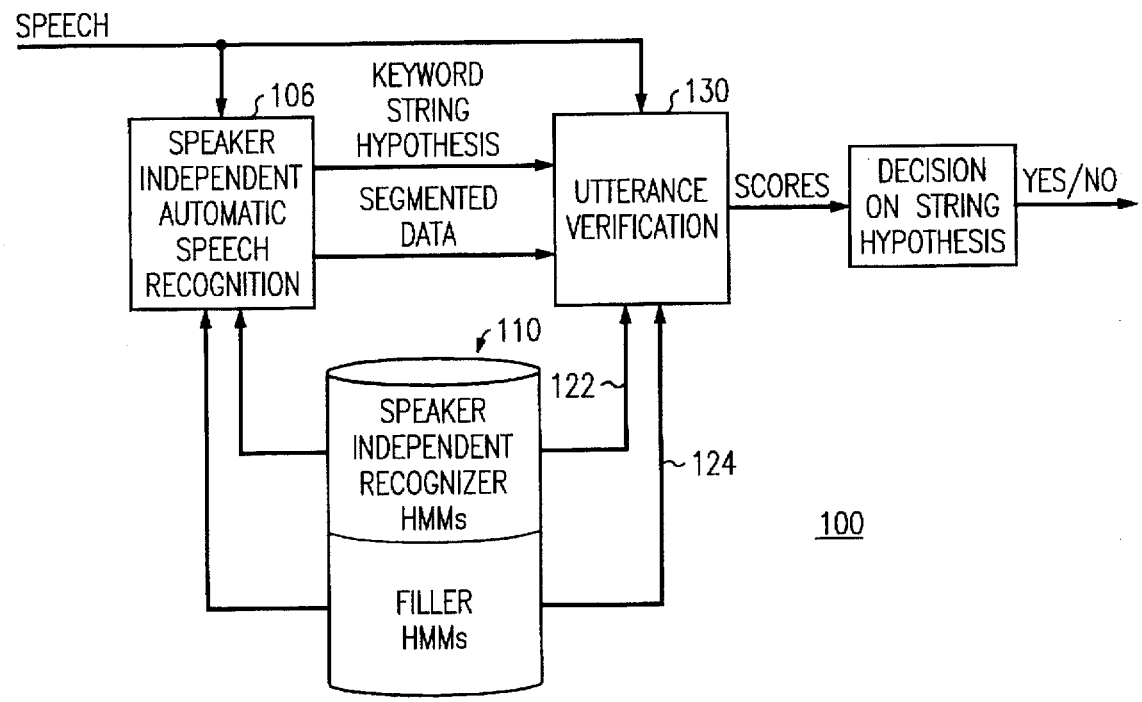
FIG. 1 illustrates a known voice recognition system.
Figure 2:
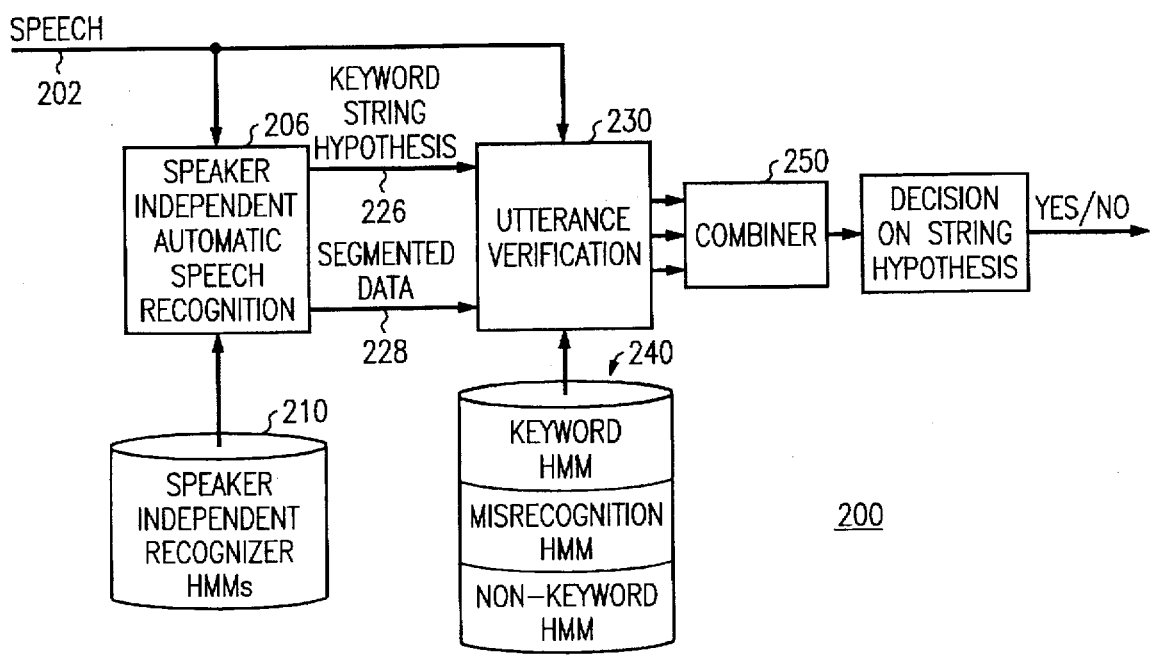
FIG. 2 illustrates a voice recognition system according to the present invention.
Figure 3:
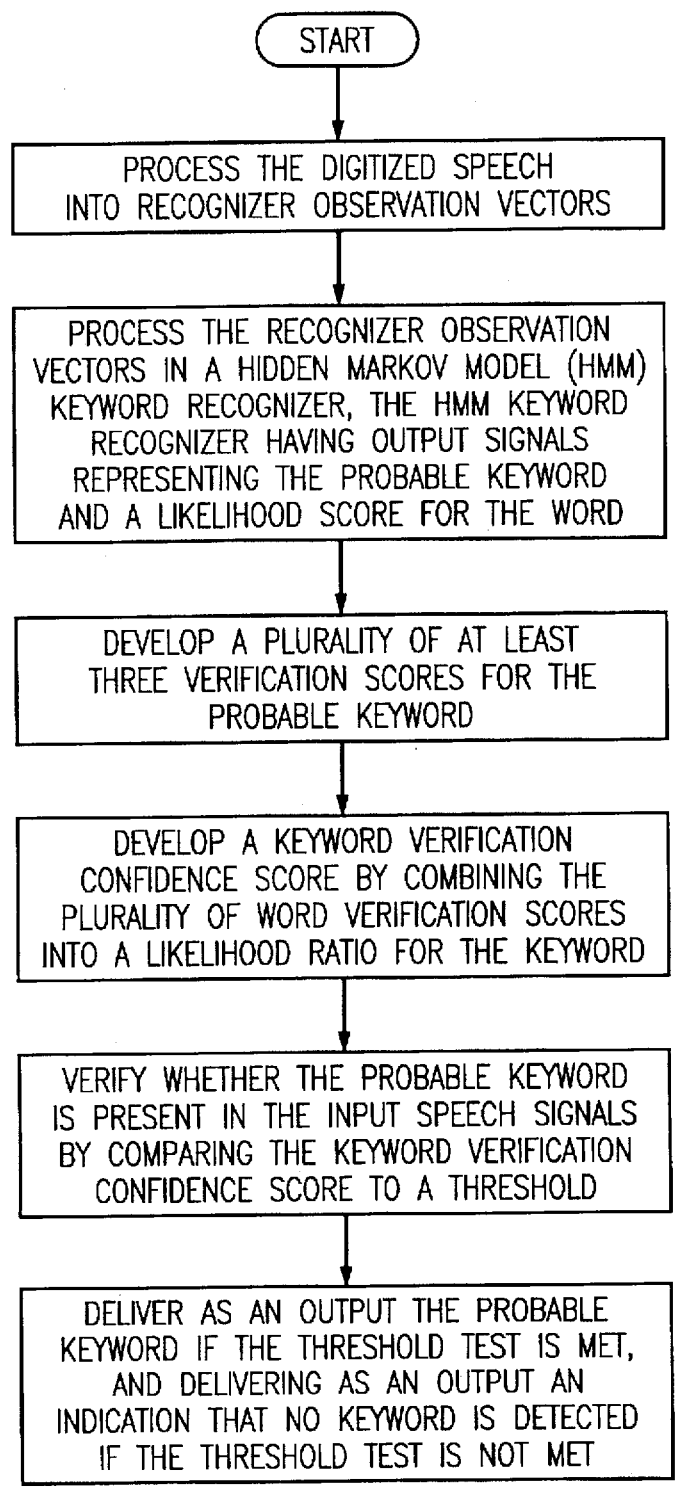
FIG. 3 is a flow diagram illustrating the method of utterance verification according to the present invention.
Figure 4:
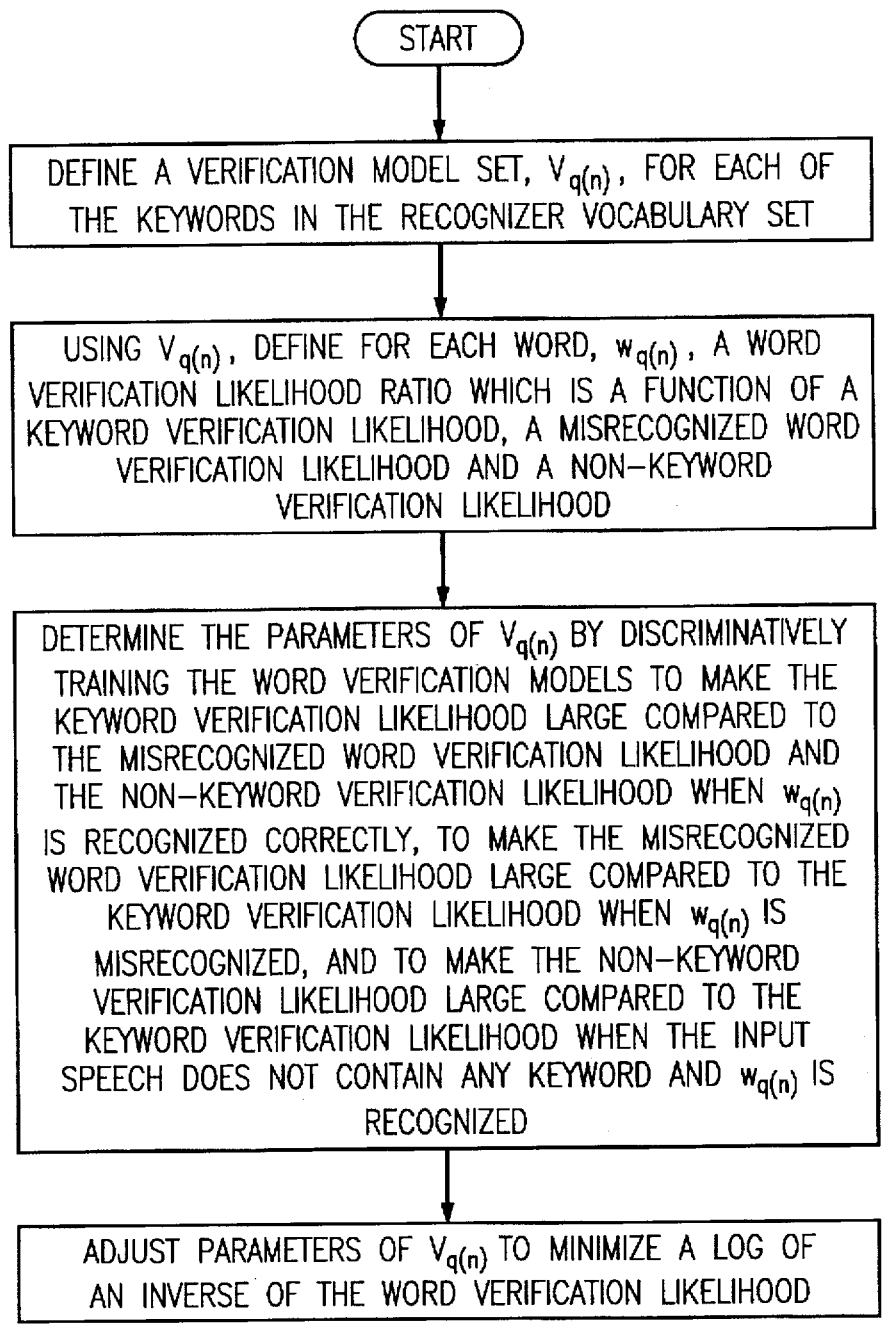
FIG. 4 is a flow diagram illustrating a method of training a voice recognition system according to the invention.

FIG. 2 shows a system 200 according to the present invention. System 200 has a speaker independent automatic speech recognition unit 206 which uses Speech Recognizer HMMs from storage unit 210 to perform speech recognition. Speech Recognition unit 206 receives input speech that has been transformed by some type of transducer, e.g. a microphone, into corresponding electrical or electromagnetic signals on line 202.

The input speech signals on line 202 corresponds to a string or sequence of words, for example a string of spoken digits. These speech signals are processed into time segments and a number of characteristic statistics. This segmentation and processing can either be performed before speech recognition unit 206, or it can be the first part of the operation of the speech recognition unit 206. The Speech Recognizer HMM set consists of models corresponding to a keyword vocabulary set. The Speech Recognizer HMMs in conjunction with Speech Recognition unit 206 perform the functions of recognizing a word string in the input speech and segmenting each input word string. The Speech Recognition unit 206 uses a high performance processor (not shown) and memory (not shown) to perform this speech recognition in real time. Such processor and memory arrangements are found in high performance personal computers, workstations, speech processing boards and minicomputers.

The word recognition function of Speech Recognizer 206 and the segmenting function are fairly standard. The recognition digit model set used is similar to the one described in the article "Context-dependent acoustic modeling for connected digit recognition" by C. H. Lee, W. Chou, B. H. Juang, L. R. Rabiner and J. G. Wilpon in Proceedings of the Acoustical Society of America 1993; and consists of continuous density context dependent subword HMMs that were trained in a task-dependent mode. The training of these recognition models is based on minimum classification error training process using the generalized probabilistic descent discriminative training framework. Once tried, the speech recognizer HMMs are stored in mass storage device 210. The output of the Speech Recognition unit 206 is a hypothesis of what keywords correspond to the string of spoken words which was inputted on line 202. This string hypothesis and the processed speech segments and components are connected by lines 226 and 228 to utterance verification unit 230 for further processing according to the present invention.

Utterance verification unit 230 tests the hypothesis for each word of a spoken string against a multiple part verification model. Ultimately, a string based test is performed and the string is either accepted or rejected, as will be explained. To accomplish these tests, likelihood ratios are used. To formulate a string based likelihood ratio test, first a word based likelihood ratio is defined that has probability distribution parameters which are determined discriminatively. First, let the general string $S = w_{q(1)} \, w_{q(2)} \, w_{q(3)} \cdots w_{q(N)}$ represent a keyword string hypothesis of length N produced by a Hidden Markov Model (HMM) recognizer with a vocabulary set of $\{w_k\}$, where $1 \leq k \leq K$. The function $q(n)$, where $1 \leq n \leq N$, then maps the word number in the string sequence S to the index of the word in the vocabulary set. By defining $O_n$ to be the observation vector sequence corresponding to the speech segment of word $w_{q(n)}$ in S, as determined by the HMM segmentation, the word likelihood ratio may be expressed as:

$$T(O_n; w_{q(n)}) = \frac{L[O_n | H_0(w_{q(n)})]}{L[O_n | H_1(w_{q(n)})]}$$

where $H_0(w_{q(n)})$ and $H_1(w_{q(n)})$ are the null and alternate hypotheses for verifying $w_{q(n)}$, respectively. In the system 200 the likelihood functions are modeled using HMMs that are different than the HMMs used in the recognition unit 206. Therefore, the immediately preceding equation may be rewritten as:

$$T(O_n; w_{q(n)}) = \frac{L[O_n | \Lambda_{q(n)}]}{L[O_n | \Psi_{q(n)}]}$$

where $\Lambda q(n)$ and $\Psi q(n)$ are the HMM sets corresponding to the null and alternate hypothesis for word $w_{q(n)}$, respectively. In general $\Lambda q(n)$ and $\Psi q(n)$ can each consist of one or more HMMs. In this work $\Lambda q(n)$ is represented by a single HMM model denoted by $\lambda_{q(n)}$, $$L[O_n|\Lambda q(n)] = L[O_n|\lambda q(n)].$$

The word likelihood ratio for $w_{q(n)}$, $T(O_n; w_{q(n)})$, is also called the verification confidence score for $w_{q(n)}$. The definition of the alternate hypothesis model is motivated by a system objective of reliably detecting both misrecognitions as well as non-keyword speech. Accordingly, a composite alternate hypothesis model consisting of a set of two HMMs is defined for use. Specifically, $\Psi_{q(n)} = \{\psi_{q(n)}, \phi_{q(n)}\}$, where $\psi_{q(n)}$ is an "anti-keyword model" modeling misrecognitions, and, $\phi_{q(n)}$ is a filler model included to model non-keyword speech. The likelihoods of the anti-keyword and filler models are combined to result in the likelihood of the composite alternate hypothesis, as follows:

$$L[O_n|\Psi_{q(n)}] = [\tfrac{1}{2}[L[O_n|\psi_{q(n)}]^\kappa + L[O_n|\phi_{q(n)}]^\kappa]]^{1/\kappa}$$

where $\kappa$ is a positive constant. We denote the verification specific model set for a given keyword, $w_{q(n)}$, as $V_{q(n)} = \{\lambda_{q(n)}, \Psi_{q(n)}, \phi_{q(n)}\}$. The likehoods of the models comprising $V_{q(n)}$, are called the verification scores or verification likelihoods for $W_{q(n)}$.

A string based likelihood ratio is defined as a geometric mean of the likelihood ratio of the words in the string, in which case the string likelihood ratio is given by:

$$T(O;S) = -\log \left[ \frac{1}{N} \sum_{n=1}^{N} [T(O_n; w_{q(n)})]^{-\gamma} \right]^{\frac{1}{\gamma}}$$

where O is the observation sequence of the whole string and $\gamma$ is a positive constant. The string likelihood ratio score, $T(O; S)$, is compared to a threshold to make the string verification decision. Defining the string likelihood score as given in the above equation suggests that the keywords with low likelihood ratio scores tend to dominate the string score. For many applications (e.g., connected digits which may be telephone numbers or account numbers) it makes good sense to reject a whole string if one or more words in the string are in error. Other forms of weighting and combining the word likelihood ratios besides the geometric mean may also be applied. The combining of the word likelihood ratios is provided by combiner unit 250.

An important feature of the present invention is that the verification HMMs are trained/optimized for minimum verification error. The verification HMMs are based on whole words. These verification HMMs are different from the speech recognizer HMMs used by the speech recognition unit 206. Conceptually, the speech recognition unit 206 is a net that gathers any utterance that remotely resembles a keyword into the catch. The utterance verification unit 230 conceptually is a filter which lets the true keywords pass and rejects everything else. Since these verification HMMs are different from the recognizer HMMs, they may be trained for optimal verification without concern for tradeoffs with recognition as occurred in the prior art. Thus, the word based verification HMMs stored in mass storage unit 240 are trained to provide minimum verification errors.

The procedure to provide minimum verification errors uses discriminative training, which is employed to determine the parameters of the verification model set, $V_{q(n)}$, for each of the keywords in the recognizer vocabulary set. Based on the definition of the word likelihood ratio given for $T(O_n; w_{q(n)})$ in the equation above, the goal of this discriminative training is three fold: i) to make $L[O_n|\lambda_{q(n)}]$ large compared to $L[O_n|\psi_{q(n)}]$ and $L[O_n|\phi_{q(n)}]$ when $w_{q(n)}$ is recognized correctly in the string, ii) to make $L[O_n|\Psi_{q(n)}]$ large compared to $L[O_n|\lambda_{q(n)}]$ when $w_{q(n)}$ is misrecognized, and iii) to make $L[O_n|\phi_{q(n)}]$ large compared to $L[O_n|\lambda_{q(n)}]$ when the input speech does not contain any keyword and $w_{q(n)}$ is recognized.

Taking the log of the inverse of the word likelihood ratio results in a log likelihood difference, written as $$G(O_n; w_{q(n)}) = -\log L[O_n|\lambda_{q(n)}] + \log L[O_n|\Psi_{q(n)}]$$

The training procedure adjusts the parameters of $V_{q(n)}$ by minimizing $G(O_n; w_{q(n)})$ when $w_{q(n)}$ is correctly recognized, and maximizing $G(O_n; w_{q(n)})$ when $w_{q(n)}$ is misrecognized or when the input speech does not contain any keyword and $w_{q(n)}$ is recognized. Examples of all three of these cases are presented during the training procedure. Since misrecognitions usually occur much less frequently than correct recognitions in a high performance recognizer, an N-best algorithm is employed during training to generate more keyword string hypotheses that include misrecognitions.

During this training, the function, $G(O_n; w_{q(n)})$ is optimized using a generalized probabilistic descent framework, such as described in "Segmental GPD training of HMM based speech recognizer" by W. Chou, B. H. Juang and C. H. Lee from Proceedings of ICASSP 1992. In such a framework $G(O_n; w_{q(n)})$ is incorporated into a smooth loss function that is conducive to applying a gradient descent procedure to iteratively adjust the parameters of $V_{q(n)}$. Specifically, the loss function gives a measure of the verification error rate for a given $w_{q(n)}$ and takes the form of a sigmoid function which is written as $$R(O_n; w_{q(n)}) = \frac{1}{1+\exp[-b\alpha G(O_n; w_{q(n)})]}$$

where $\alpha$ is a constant controlling the smoothness of the sigmoid function, and b takes on the binary values of +1 and −1 as follows:

+1 if wq(n)∈CR

−1 if wq(n)∈MR

−1 if wq(n)∈NR

For the values of b, CR refers to the class where $w_{q(n)}$ is correctly recognized, MR refers to the class where $w_{q(n)}$ is misrecognized and NK refers to the class where the input speech contains no keyword with $w_{q(n)}$ being recognized. The loss function, $R(O_n; w_{q(n)})$ shown above, is iteratively minimized with respect to the parameters of $V_{q(n)}$ during the training procedure. However, at each iteration, only a subset of the models in the set $V_{q(n)}$ are updated depending on the class in which $w_{q(n)}$ falls. If $w_{q(n)} \in CR$, then all three models in the set are updated. If $w_{q(n)} \in MR$, then $\lambda_{q(n)}$ and $\Psi_{q(n)}$ are updated. Finally, if $w_{q(n)} \in NK$, then only the filler model, $\phi_{q(n)}$, is updated. In this fashion, the function of each of the models in the verification model set, $V_{q(n)}$ is controlled and fine tuned for the desired minimum error operation.

In Operation

A connected digit recognition task was used to evaluate the verification performance of the word based minimum verification error (WB-MVE) method. The database used in the evaluation consisted of a training set of 16089 digits strings and a testing set of 21723 strings. The string lengths ranged from 1 to 16 digits with an average string length of 5.5. This database represents a collection of speech collected from many different trials and data collection efforts over the U.S. telephone network. Therefore, it contains a wide range of recording conditions. To evaluate "out of vocabulary" performance, we used a second speech database that does not have any digit strings. It consists of 6666 phonetically balanced phrases and sentences, where 3796 phrases were used for training and the rest for testing.

The recognizer feature vector consisted of the following 39 parameters: 12 LPC derived cepstral coefficients, 12 delta cepstral coefficients, 12 delta-delta cepstral coefficients, normalized log energy, and the delta and delta-delta of the energy parameter. The recognition digit model set was similar to the one used in the article "Context-dependent acoustic modeling for connected digit recognition" by C. H. Lee, W. Chou, B. H. Juang, L. R. Rabiner and J. G. Wilpon in Proceedings of the Acoustical Society of America 1993 mentioned previously, and consisted of continuous density context dependent subword HMMs that were trained in a task-dependent mode. The training of these recognition models was based on minimum classification error training using the generalized probabilistic descent discriminative training framework set forth in the article "Context-dependent acoustic modeling for connected digit recognition" by C. H. Lee, W. Chou, B. H. Juang, L. R. Rabiner and J. G. Wilpon in Proceedings of the Acoustical Society of America 1993. The trained speech recognizer HMMs are stored in storage device 210 for use by a CPU and a memory (not shown) to provide the speaker independent recognition function. A string error rate of 4.86% with a null grammar was achieved with these models. The corresponding word error rate was 1.14%.

To benchmark the performance of the WB-MVE method of the present invention, it was compared to another high performance utterance verification technique suggested by M. G. Rahim, C. H. Lee and B. H. Juang in their article "Discriminative Utterance Verification for Connected Digits Recognition" to be published in Proceedings of Eurospeech '95, in September 1995. In this baseline method, the verification hypothesis testing was performed using the same models used in the recognition phase. It should be noted that while the technique suggested in the baseline method uses no additional model memory space for utterance verification, the amount of computation necessary for determining the string confidence score is much higher than the WB-MVE method of the current invention.

Figure 5:
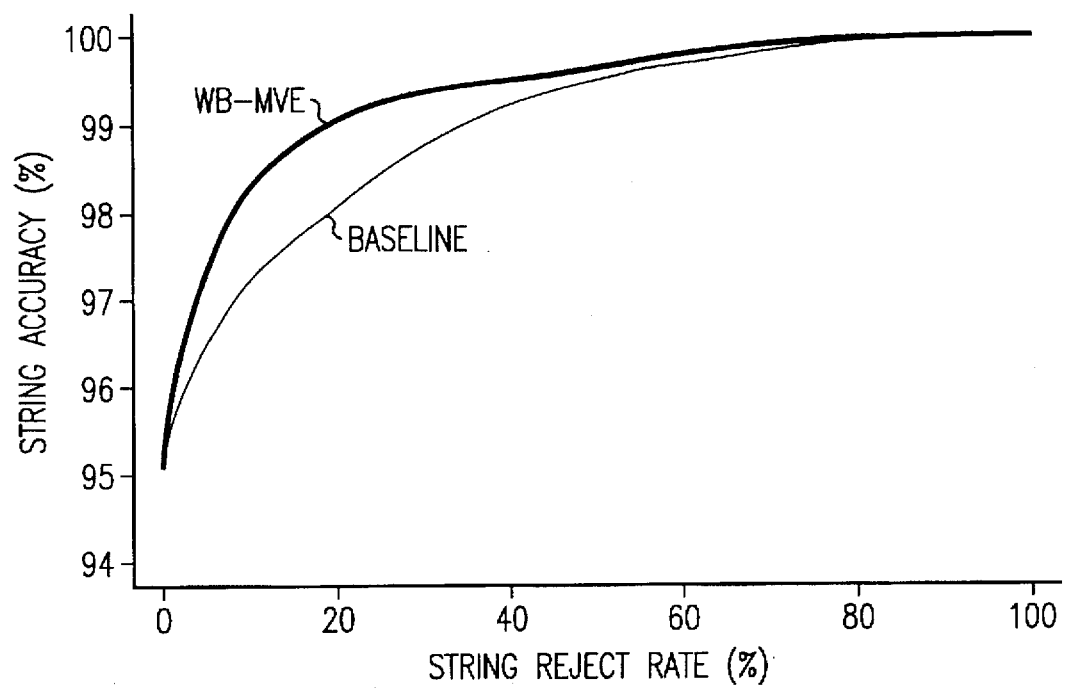
FIGS. 5–7 are plots of data showing various performance characteristics of the present invention and of another well performing system.
Figure 6:
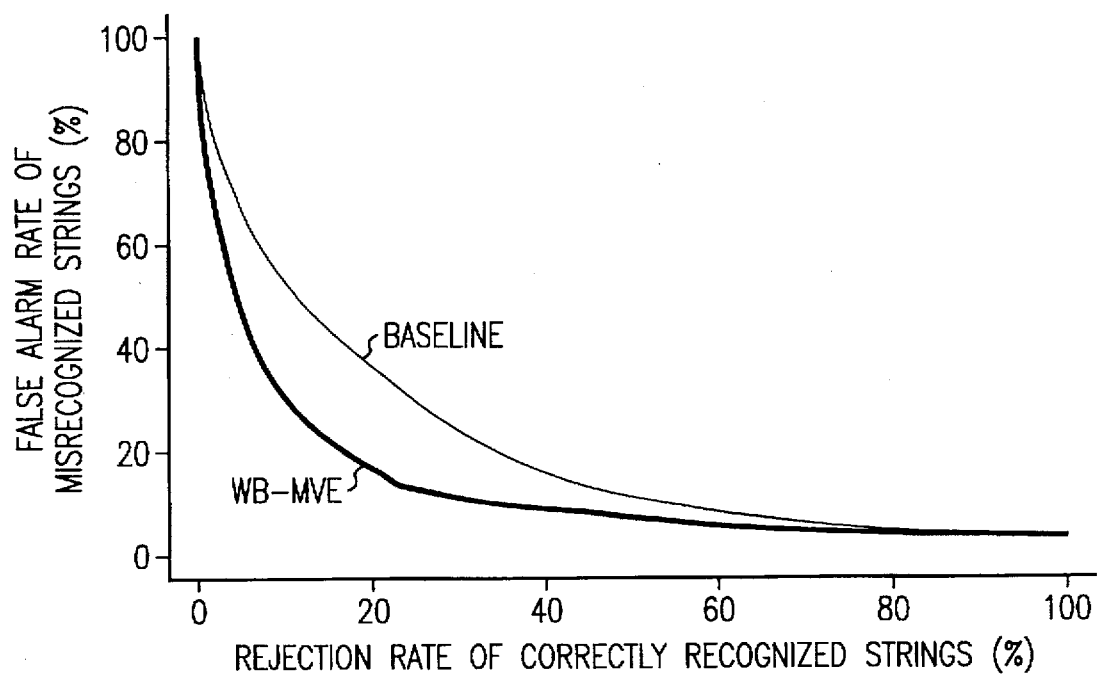
Figure 7:
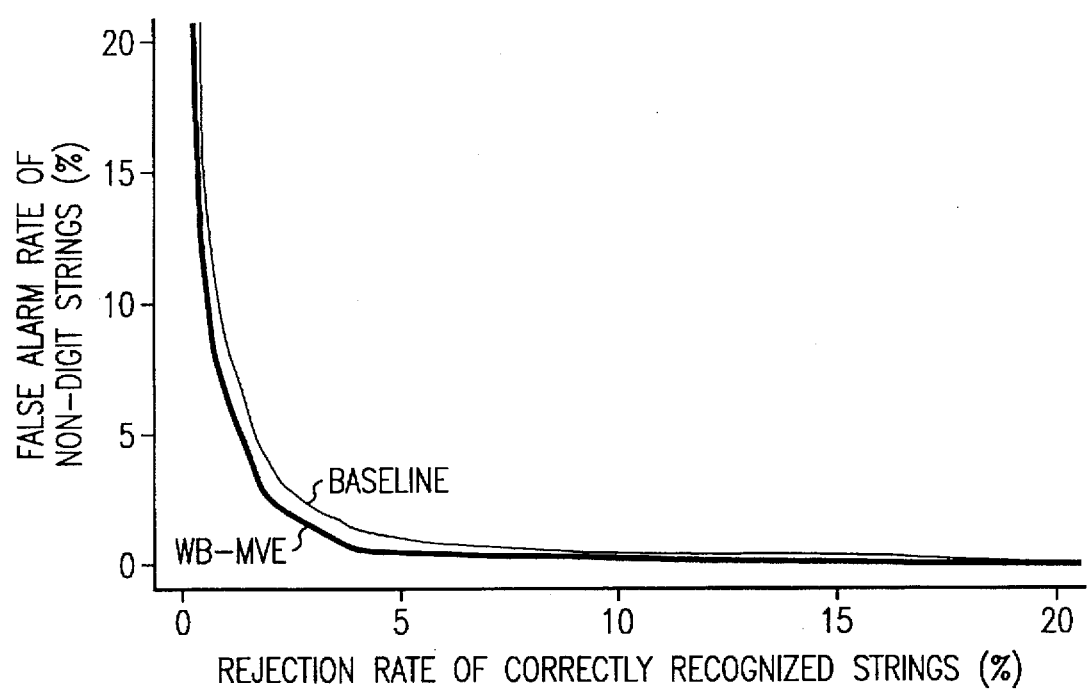

The WB-MVE model set, $V_{q(n)}$, represents context independent models that are discriminatively trained. Each model in the set, $V_{q(n)}$, is represented by a 10 state, 8 mixture HMM. A total of 11 sets corresponding to the digits 0–9 and oh are trained. FIGS. 5–7 show the performance of the baseline method compared with that of the WB-MVE method. FIG. 5 shows string accuracy as a function of string rejection rate. Another way of viewing the improvement in recognition accuracy as a function of the string rejection rate is shown in FIG. 6. FIG. 6 represents an ROC curve showing the false alarm rate of valid digit strings that are incorrectly recognized versus the false rejection rate of strings that are correctly recognized. FIGS. 5 and 6 show that the WB-MVE system and method significantly outperform the baseline system and method. For example at an operating point of 5% string rejection, the WB-MVE-based system and method result in a 2.70% string error rate compared to 3.51% string error rate for the baseline system and method. The verification performance on the non-keyword database is shown in FIG. 7. FIG. 7 shows an ROC curve of the false alarm rate of non-keyword strings versus false rejection of correctly recognized strings. Here the performance of the two methods is comparable and both are able to reject in excess of 99% of non-keyword sentences at the 5% overall string rejection level.

While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

What is claimed is:

1. A method for use in a speech recognition system to verify whether input speech signals comprising digitized speech represents a probable keyword, said probable keyword being determined by a speech recognizer, said method comprising the steps of:

processing said digitized speech into recognizer observation vectors;

processing said recognizer observation vectors in a Hidden Markov Model (HMM) keyword recognizer, said HMM keyword recognizer having output signals representing said probable keyword and a likelihood score for said word;

developing a plurality of at least three verification scores for said probable keyword;

developing a keyword verification confidence score by combining said plurality of word verification scores into word likelihood ratio for said keyword;

verifying whether said probable keyword is present in said input speech signals by comparing said keyword verification confidence score to a threshold; and delivering as an output said probable keyword if said threshold test is met, and delivering as an output an indication that no keyword is detected if said threshold test is not met.

2. A method in accordance with claim 1 wherein models used for developing said plurality of verification scores are independent of the models used in the HMM recognizer, and are determined by a discriminative training procedure.

3. A method in accordance with claim 2, wherein said discriminative training procedure includes the step of iteratively training all models used for developing said plurality of verification scores for a keyword to provide minimum verification errors.

4. A keyword detection apparatus that determines whether a digitized speech signal includes one of a preselected plurality of keywords, said apparatus comprising:

means for receiving input signals representing digitized speech and developing a plurality of signal representing feature vectors of said digitized speech;

means responsive to said input signals and said signals representing feature vectors of said digitized speech for developing output signals representing a probable keyword, one or more subword segments of said probable keyword, and one or more likelihood scores for each of said speech segments;

means for developing a plurality of word based verification model scores for said probable keyword;

means for determining a confidence score by combining said plurality of word based verification scores of said word; and means for comparing said confidence score against a threshold value for determining whether the probable keyword is present in said input signals.

5. A method for utterance verification of a speech recognized word hypothesis to verify keywords, comprising the steps of:

defining a plurality of word based verification HMMs, which are determined discriminatively;

defining a plurality of observation vectors corresponding to a word hypothesis as determined by HMM segmentation;

testing said observation vectors corresponding to said word hypothesis against said plurality of word based word verification HMMs including a keyword based verification HMM, a misrecognition word based HMM and a non-keyword speech based HMM; and combining the results of hypothesis testing by said plurality of word based verification HMMs to determine if a threshold has been passed, if it has been passed said word is verified, otherwise it is rejected.

6. A method for utterance verification of a string of speech recognized words each having a speech recognized word hypothesis to verify a keyword string, comprising the steps of:

defining a plurality of word based verification HMMs, which are determined discriminatively;

defining a plurality of observation vectors corresponding to each word hypothesis of the string as determined by HMM segmentation;

testing said observation vectors corresponding to each said word hypothesis against said plurality of word based verification HMMs including a keyword verification HMM, a misrecognition HMM and a non-keyword HMM to obtain confidence scores;

combining the likelihood scores of the hypothesis testing by said plurality of word based verification HMMs for each word of said string and forwarding said confidence scores to a combiner; and combining said confidence scores of each word in said string; and, if a threshold has been passed, said string is verified; otherwise, it is rejected.

7. A method for training verification HMMs for providing word based minimum verification error; comprising the steps of:

determining parameters of a verification model set, $V_{q(n)}$, for each of the keywords in the recognizer vocabulary set;

defining for each word, $W_{q(n)}$, a word verification likelihood ratio, which is a function of a keyword verification likelihood, a misrecognized word verification likelihood, and a non-keyword verification likelihood;

discriminatively training said word verification likelihood to make said keyword verification likelihood large compared to said misrecognized word verification likelihood and said non-keyword verification likelihood when $W_{q(n)}$ is recognized correctly, to make said misrecognized word verification likelihood large compared to said keyword verification likelihood, when $W_{q(n)}$ is misrecognized and to make said non-keyword verification likelihood large compared to said keyword verification likelihood when the input speech does not contain any keyword and $W_{q(n)}$ is recognized; and adjusting parameters of $V_{q(n)}$ to minimize a log of an inverse of the word verification likelihood ratio.

8. A method according to claim 7, wherein said training is done using a generalized probabilistic descent technique.

* * * * *